(12) United States Patent
Chou et al.

(10) Patent No.: US 6,561,247 B2
(45) Date of Patent: May 13, 2003

(54) METHOD AND APPARATUS FOR REPAIRING A DISCRETE DAMAGED PORTION OF AN ARTICLE SURFACE

(75) Inventors: Chen-Yu J. Chou, Cincinnati, OH (US); Philip R. Griggs, Cincinnati, OH (US); Larry D. Cline, Fairfield, OH (US)

(73) Assignee: General Electric Company, Schenectady, NY (US)

( * ) Notice: Subject to any disclaimer, the term of this patent is extended or adjusted under 35 U.S.C. 154(b) by 218 days.

(21) Appl. No.: 09/749,351

(22) Filed: Dec. 27, 2000

(65) Prior Publication Data

US 2001/0054473 A1 Dec. 27, 2001

Related U.S. Application Data

(62) Division of application No. 09/106,550, filed on Jun. 29, 1998.

(51) Int. Cl.[7] ............................................... B32B 35/00
(52) U.S. Cl. ...................... 156/382; 156/94; 156/285; 425/11; 425/13
(58) Field of Search ............................ 156/94, 98, 285, 156/286, 381, 382; 264/36.1, 36.21, 36.22; 425/11, 12, 13, 85; 244/133; 269/21; 34/92, 242

(56) References Cited

U.S. PATENT DOCUMENTS

| | | | |
|---|---|---|---|
| 3,765,975 A | * 10/1973 | Hollingsworth | 156/94 |
| 3,993,520 A | 11/1976 | Werner et al. | 156/94 |
| 4,554,036 A | 11/1985 | Newsom | 156/94 |
| 4,560,428 A | 12/1985 | Sherrick et al. | 156/94 |
| 4,681,520 A | * 7/1987 | Birkhauser, III | 156/94 |
| 4,824,500 A | 4/1989 | White et al. | 156/94 |
| 5,156,853 A | * 10/1992 | Werner et al. | 156/285 |
| 5,348,316 A | * 9/1994 | Lin | 279/3 |
| 5,595,692 A | 1/1997 | Folsom et al. | 264/36.1 |

* cited by examiner

Primary Examiner—Michael W. Ball
Assistant Examiner—Gladys Corcoran
(74) Attorney, Agent, or Firm—David L. Narciso; Lee H. Sachs

(57) ABSTRACT

A method for repairing a discrete damaged portion of an article surface, for example of a laminated composite material, includes applying an uncured repair material at the damaged portion and then subjecting the repair material and the discrete damaged portion to a vacuum to remove air entrapped in the repair material and the discrete damaged portion. One form of the invention uses a vacuum tool comprising an outer wall including an opening there through having a peripheral edge shaped to conform generally with a portion of the article surface about the damaged portion, and gas evacuation means. The tool is combined with a releasable gas seal generally shaped to interface between the peripheral edge and the article surface and release from the article surface.

7 Claims, 5 Drawing Sheets

METHOD AND APPARATUS FOR REPAIRING A DISCRETE DAMAGED PORTION OF AN ARTICLE SURFACE

This is a division of patent application Ser. No. 09/106,550, filed Jun. 29, 1998, still pending.

BACKGROUND OF THE INVENTION

This invention relates to the repair of a discrete damaged portion of an article surface, and more particularly in one form, to the repair of a delaminated surface portion of a fiber reinforced composite laminated turbine engine blade.

Certain gas turbine engine blades designed to operate at relatively lower gas turbine engine temperatures, for example temperatures experienced in a fan or front portion of a low pressure compressor, have been manufactured from fiber reinforced laminated composite materials. Such blades and structures have been widely described in the literature, examples of which are U.S. Pat. Nos. 3,883,267—Baudier et al., patented May 13, 1975; and 5,375,978—Evans et al., patented Dec. 27, 1994. Such patents, in some forms, show details of composite laminated blades of a general type to which the repair of the present invention particularly is related.

Design of certain turbine engine components includes assembly of cooperating articles one of which has a relatively softer surface which can be damaged such as by operating vibration or by erosion, abrasion, etc. during operation with a harder surface of the other. Also, damage can occur due to stresses during molding. One example is a fiber reinforced composite laminated gas turbine engine fan blade having a blade root assembled with and carried by a harder metal disk. Operation of the engine can result in such damage to the softer blade root. When such damage includes delamination of composite plies at a surface of a blade, for example a blade root surface, it is economical to repair the surface rather than to replace the entire article.

Procedures that are commonly used to repair articles having a composite structure include application, such as through pressure means of repair material, for example low viscosity adhesive resin, into a damaged area. Then the article is placed and held in a suitable environment until curing of the repair material is completed. Because of air included or entrapped within the damaged portion and/or the repair material during its preparation for example mixing of a resin and a catalyst, such conventional repair is prone to create internal porosity within the repair during subsequent curing. Therefore, improvement of such conventional type of repair method is desirable to repair high speed rotating modern gas turbine engine fiber reinforced composite fan blades.

BRIEF SUMMARY OF THE INVENTION

The present invention, in one form, provides a method for repairing a discrete damaged portion of an article surface comprising applying uncured repair material at the damaged portion and then subjecting the uncured repair material and the discrete damaged portion to a vacuum to remove entrapped air. In another form, the invention includes providing a vacuum tool sized to cover the discrete damaged portion. The vacuum tool comprises an outer wall including an opening there through, a peripheral edge about the opening and shaped to conform generally with a portion of the article surface about the damaged portion, and gas evacuation means to evacuate gas from within the tool. The method includes providing a releasable gas seal for use between the peripheral edge and the article surface, and providing an uncured repair material. In one form, the repair material then is deposited at the damaged portion and the tool is sealed about the damaged portion through the gas seal. In another form, the repair material is disposed after sealing. Gas is evacuated from within the tool through the gas evacuation means to provide a vacuum adequate to remove entrapped air from the repair material and the discrete damaged portion and less than an amount which results in substantial removal of a required volatile component of the repair material. Then the tool and the releasable gas seal are removed from the article surface.

In another form, the present invention provides a vacuum tool comprising the above described outer wall and the gas evacuation means, in combination with a releasable gas seal generally shaped to interface between and release from the peripheral edge and the article surface.

DETAILED DESCRIPTION OF THE INVENTION

Figure 1:
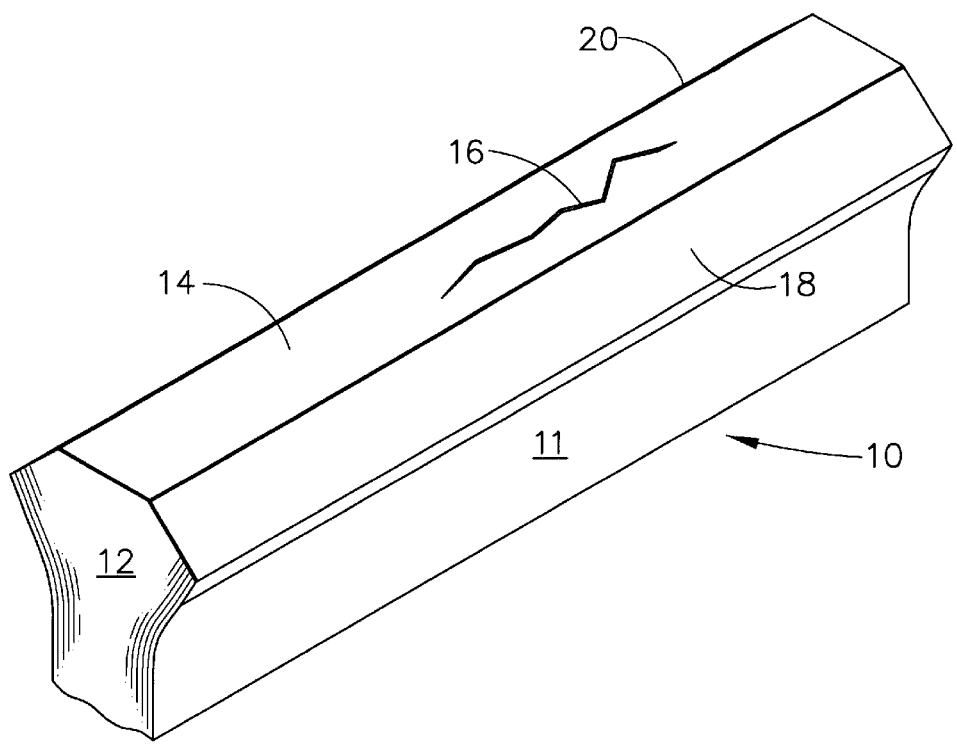
FIG. 1 is a perspective fragmentary view of a fan blade root showing a discrete damaged portion as a delamination.

The root portion of a fiber reinforced laminated composite, high speed rotating, large wide chord blade of the type designed and used in the fan section of modern gas turbine engines is subject to forces, when molded or during operation, which can result in damage in the form of delamination of plies at a surface portion of the root. For example, discrete, distinct delaminations have been observed on the radially inward facing portion of the root, sometimes referred to as the inboard surface. Such an individual discrete delamination is shown in the drawings and is representative of a discrete damaged portion of the article to which the present invention is related.

With reference to the drawings, FIG. 1 is a perspective fragmentary view of the above described type of large wide chord gas turbine engine fan blade, shown generally at 10. The blade includes a blade airfoil 11 and a blade root 12 having an inboard surface 14 in which there is a discrete damaged portion 16 in the form of a delamination in that article surface resulting from the press molding of the article or during its operation in an engine. Adjacent to the inboard surface 14 are root surfaces 18 and 20 which, together with inboard surface 14, define a portion of the article surface about the damaged portion or delamination. As is shown in the sectional views of FIGS. 5 and 6, the delamination extends into the blade root from inboard surface 14.

The method of the present invention comprises removing entrapped air from an uncured repair material deposited at a discrete damaged portion as well as from within the damaged portion such as a delamination by subjecting the repair material and the damaged portion to a vacuum before fully curing. The term "uncured" as used herein in respect to the repair material is intended to include uncured as well as partially but not fully cured repair material capable of having entrapped air removed by the use of a vacuum.

According to one form of the present invention, in the repair of the discrete damaged portion such as the delamination 16, there is provided a vacuum tool sized to cover and be sealed about such portion. One form of such a tool is shown in the drawings and in more detail in the perspective, partially sectional view of FIG. 2. That form of the tool is a generally rectangularly shaped box 22 comprising an outer wall defined by a plurality of outer wall portions 24, 26, 28, 30 and 32. In the example of the drawings, all of the wall portions except wall portion 26 are shown as metal structures. Wall portion 26 is shown as a plastic, such as transparent Lexan sheet material to enable viewing within tool 22 during practice of the repair method. The outer wall includes an opening 34 defined by a peripheral edge 36 about the opening and shaped to conform generally with a portion of the article surface about the damaged portion 16. The vacuum tool associated with the present invention is shown in the drawings in one preferred form to be in the shape of a box-like structure. However, it should be understood that any configuration of the tool of the present invention can be used, for example comprising a continuous outer wall such as in a closed pipe or other conduit, so long as the tool includes an opening defined by a peripheral edge shaped to conform with a portion of the article surface about and outside of the damaged portion. In another form, such a tool can be shaped with an opening which can be sealed over the entire article end portion, such as the blade root at a radially inward portion of the blade airfoil so as to enclose the entire blade root. In still another form, such tool can be shaped to enclose the entire blade.

Figure 2:
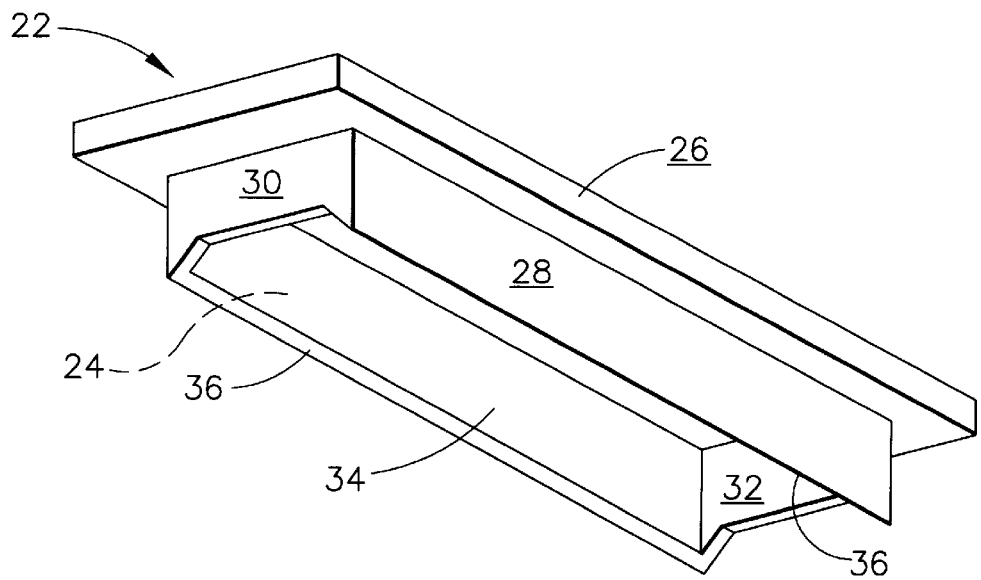
FIG. 2 is a perspective, partially sectional view of a form of vacuum tool.
Figure 3:
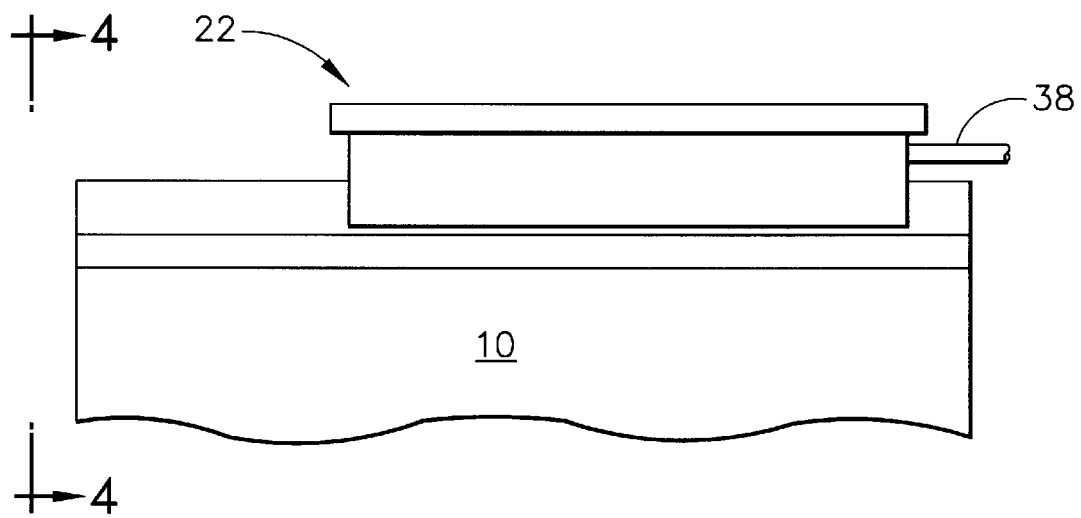
FIG. 3 is a diagrammatic fragmentary view of the blade root from the airfoil pressure side with the vacuum tool of FIG. 2 in position over the damaged portion.
Figure 4:
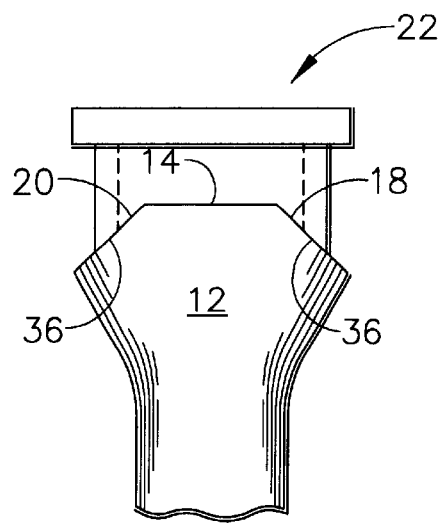
FIG. 4 is a fragmentary view of FIG. 3 taken along lines 4—4.
Figure 5:
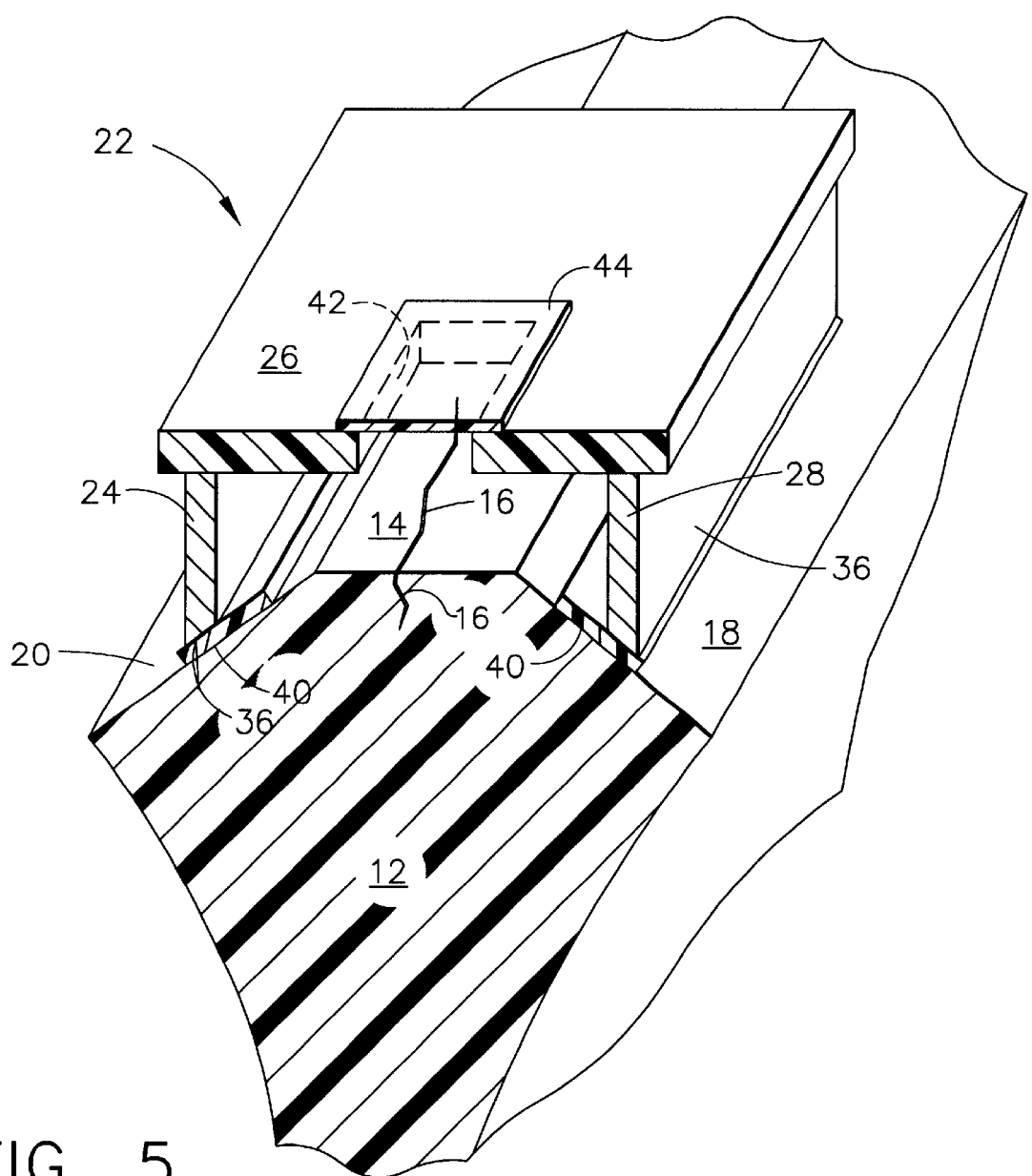
FIG. 5 is a fragmentary sectional view of the blade root and a form of the vacuum tool sealed about the damaged portion.

In the fragmentary, diagrammatic views of FIGS. 3 and 4, with FIG. 4 being taken along lines 4—4 of FIG. 3, the tool of FIG. 2 shown generally at 22 is positioned on blade root 12 over the damaged portion 16. Peripheral edge 36 of the vacuum tool conforms generally with root surfaces 14, 18 and 20 to cover the discrete damaged portion 16 of the blade root 12 and to facilitate sealing of the tool to the root surfaces. As is shown in FIG. 5, the peripheral edge 36 is releasably sealed with such root surfaces. Vacuum tool 22 includes a gas evacuation means 38, shown in FIGS. 3 and 7, to enable evacuation of gas, typically primarily air, from within the tool 22. If a solvent not required in curing of the repair material is included, removal of such solvent can be enhanced by the vacuum generated within the tool.

The fragmentary sectional view of FIG. 5 shows the above described form of vacuum tool 22 positioned on blade root 12 over damaged portion 16 in the form of a discrete delamination extending along a part of inboard surface 14 and into blade root 12. Peripheral edge 36 about opening 34 is releasably sealed with the blade root surfaces 14, 18 and 20 through a releasable gas seal 40, for example conveniently in the form of a double sided adhesive tape, one form of which sometimes is called and sold commercially as vacuum bag sealant tape. Releasable gas seal 40 generally is shaped to interface between the peripheral edge 36 and the article surface and release from the article surface. In one example, such a tape first was applied to peripheral edge 36 and then the edge carrying the tape was pressed onto the blade root surfaces. Alternatively, the sealing tape can first be applied to the article surface and then the peripheral edge can be pressed to the tape. In other forms, the releasable gas seal can be secured more permanently with peripheral edge 36 so long as it is releasable from the article surface.

One form of the present invention includes the step of and means to deposit or deliver repair material at the damaged portion after sealing of the peripheral edge with the root surfaces and after a vacuum has been provided within the tool. To enable such a delivery, one form of the tool 22, in FIG. 5 as well as the tool shown in FIG. 7, includes through outer wall portion 26 a port 42 over which is sealed a self sealing member 44, for example in the form of an elastic plug, membrane or tape. Port 42 is located in wall portion 26 to enable positioning of port 42 generally opposite the damaged portion when the tool is sealed with the article surface. Repair material can then be delivered, such as through a syringe, to the damaged portion without disruption of the vacuum within the tool. However, it should be understood that other gas sealing repair material delivery means, for example a conduit with a valve such as a petcock controlled flow means, can be disposed through a wall of the tool to direct repair material flow to the damaged portion while under vacuum.

Another form of the present invention does not include delivery of the repair material after a vacuum has been provided within the tool; and the tool would not necessarily include the above described sealed delivery port. That method form disposes the repair material at the damaged portion prior to releasably sealing of the tool to the root surfaces and prior to providing a vacuum within the tool. A vacuum subsequently is provided in a range adequate to remove entrapped air from the repair material and from the damaged portion but less than a vacuum amount which results in substantial removal of a required volatile component of the repair material, for example, required for adequate curing of the repair material.

Figure 6:
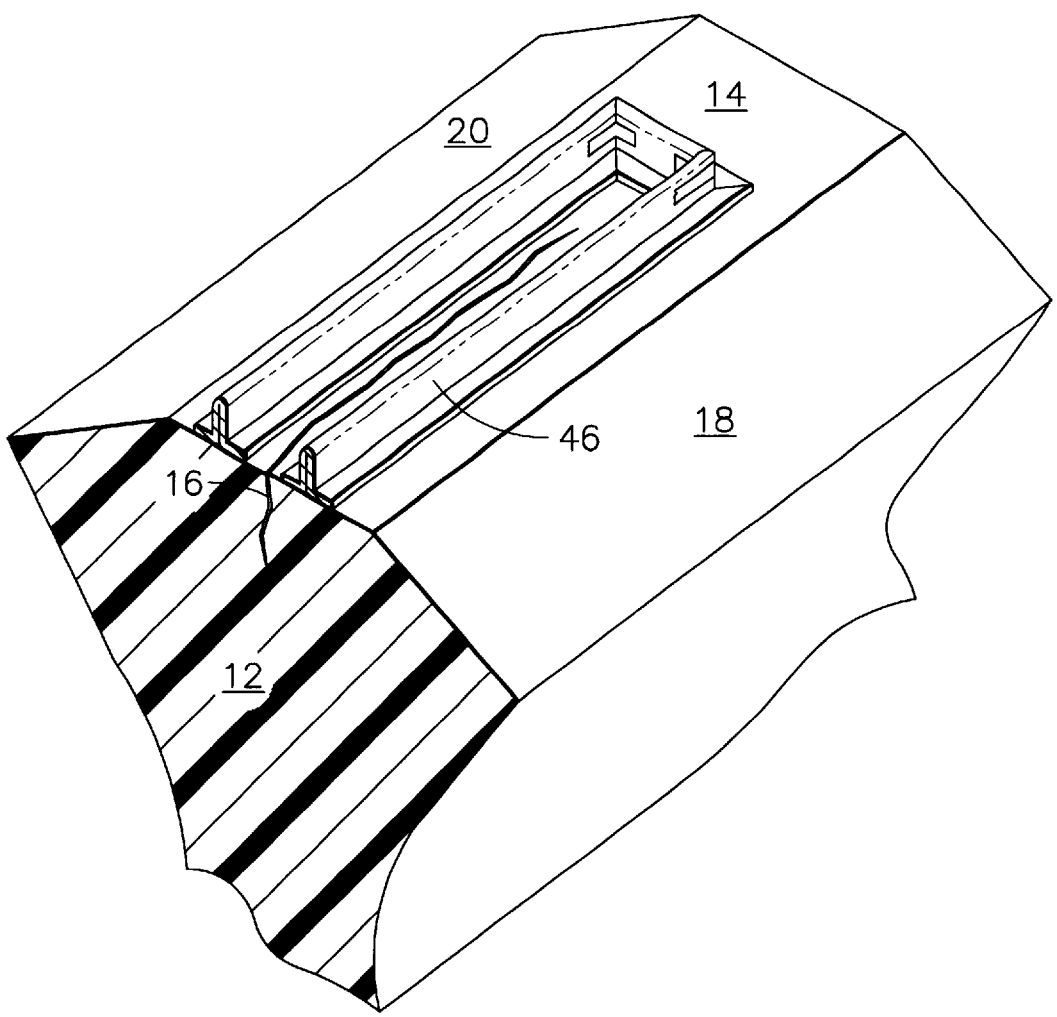
FIG. 6 is a fragmentary sectional view showing a repair material confinement means in the form of dam about the damaged portion.

A preferred form of the present invention is a repair material confinement means to confine the repair material at the discrete damaged portion and to avoid excessive flow of fluid repair material on the root surface away from the damaged area. Such a confinement means is shown in FIG. 6 in the form of a dam 46 attached to root surface 14 about damaged portion 16. Dam 46 was constructed from metal foil tape folded and sealed together in the shape shown in FIG. 6. In another example, the dam was constructed from the above described double sided adhesive tape.

Figure 7:
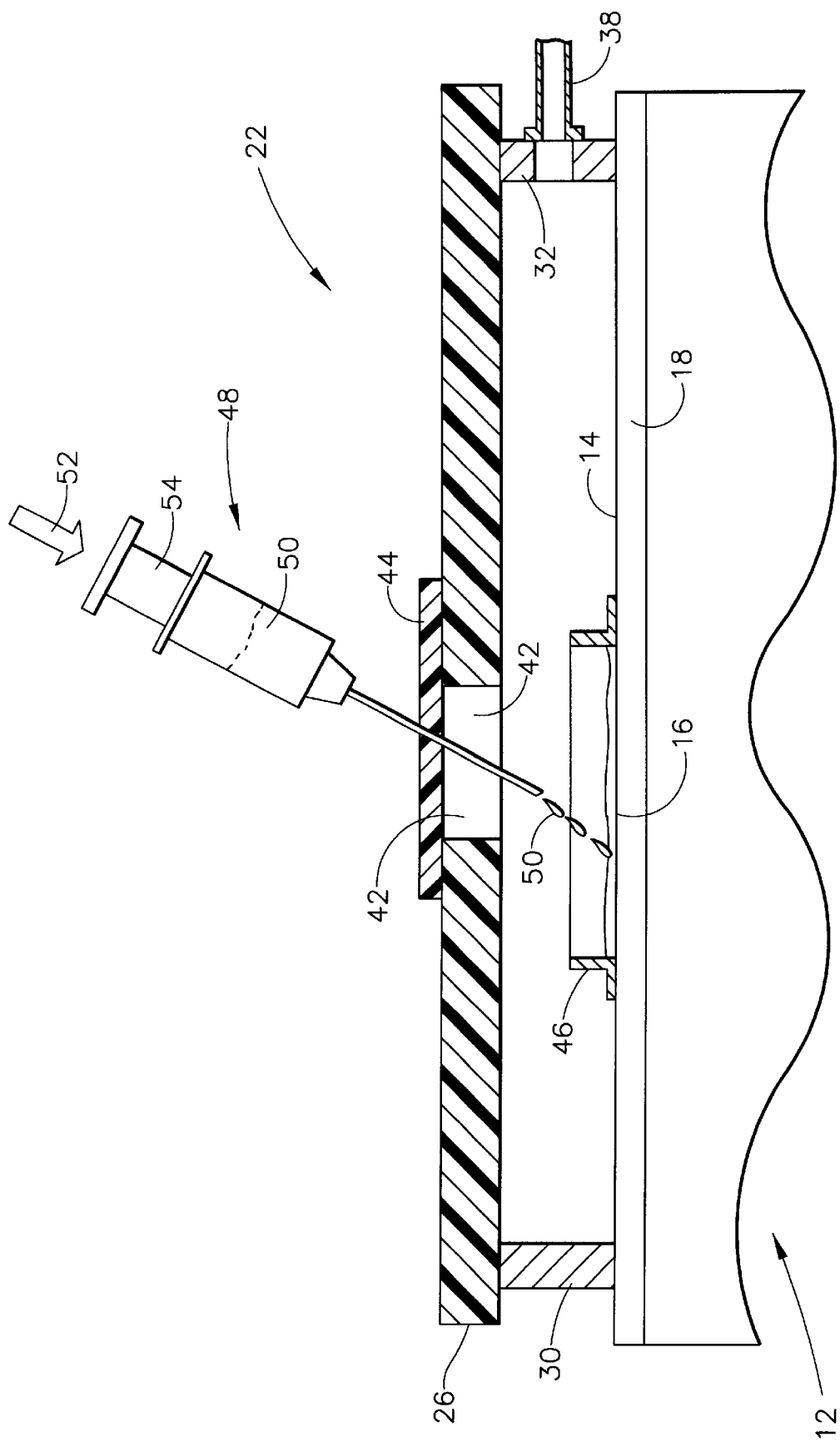
FIG. 7 is a fragmentary sectional view of the dam of FIG. 6 within the vacuum tool of FIG. 5, and showing one means to provide repair material to the damaged portion.

The fragmentary sectional view of FIG. 7 shows the dam 46 of FIG. 6 disposed on inboard surface 14 and about discrete damaged portion 16 within the vacuum tool 22 of FIG. 5. Included in FIG. 7 is a repair material depositing means in the form of syringe 48 including a fluid repair material 50 being deposited, as result of force 52 on syringe plunger 54, onto the damaged portion 16 within dam 46. Penetration through and later withdrawal of syringe 48 from self sealing membrane 44 over port 42 enables maintenance of a vacuum within the vacuum tool 22 during such delivery or deposit of repair material 50. Included with tool 22 is a gas evacuation means in the form of a tube 38 connected to an appropriate vacuum pumping means (not shown) to enable provision of a vacuum within a selected range. If desired, a vacuum gauge (not shown) can be included through the outer wall for measurement and monitoring of the vacuum.

According to one form of the present invention, the vacuum provided within tool 22 is selected to be in a range which is sufficient to remove air entrapped within the fluid, uncured repair material to avoid creation of porosity within the final repaired portion. However, the vacuum is less than an undesirable amount which will remove a substantial amount of a required volatile component of the repair material. With the use of catalyzed fluid epoxy resin type of repair materials typically used for repair of fiber reinforced laminated composite articles, the vacuum range is selected to be at least about 24" Hg gauge and less than about 28" Hg gauge at sea level. It has been found the less than about 24" Hg gauge is insufficient to remove entrapped air from the repair. Also, it has been observed that greater than about 29" Hg gauge with such epoxy repair resins results in removal of substantial amounts of required volatiles from the resin sufficient to adversely affect the resin's ability to be used for a sound repair.

As was mentioned above, practice of the method of the present invention can include deposition of the repair material onto the discrete portion before or after sealing of tool 22 over such portion and generation of the vacuum within the tool. If the repair material is deposited first, entrapped air is removed as the vacuum is generated and held. However, a preferred form of the invention is to combine a liquid resin and a catalyst, and then place the catalyzed resin in a vacuum within the above range to remove air entrapped within the resin or to combine the liquid resin and the catalyst within a vacuum chamber with the vacuum within the above range. That treated resin then is deposited within the tool of the present invention after the tool has been sealed over the discrete damaged area and a vacuum in the above described range has been provided within the tool. After provision of the degassed resin at the discrete damaged portion, the vacuum was released and the tool and releasable gas seal were removed from the article surface.

One demonstrated form of the present invention applied pressure to fluid repair material, toward the discrete damaged portion, after a vacuum had been applied to remove entrapped air. Such a step was conducted, after release of the vacuum, to help the repair material fill and wet the damaged portion.

Curing of the deposited repair resin can be accomplished in the usual manner depending upon the type of resin or material used for the repair material. Typically, a catalyzed adhesive epoxy resin when held at about room temperature, for example about 75° F., can take as much as about 5 days to cure adequately. However, heat can be applied, for example using an oven, to enhance curing and reduce curing time. In one example the resin deposited according to the present invention was heated to about 150° F. and was cured in about 90 minutes.

The present invention can be used to repair discrete damaged portions of newly manufactured articles as well as those which have experienced use or operation. However, one form of the method of the present invention includes the step of holding an article which has been operated, for example a fan blade which has been operated in a gas turbine engine, under the vacuum for a time, prior to depositing the repair material, sufficient to enable removal by the vacuum of moisture entrapped within the surface to be repaired. Heat can be applied to enhance moisture removal This moisture removal enhances bonding of the repair material with the structural material of the article.

During one evaluation of the present invention, a discrete damaged portion in the form of a delamination in the inboard root surface of a fiber reinforced composite gas turbine engine fan blade was repaired using as the repair material a two part epoxy fluid adhesive resin room temperature curing system marketed by the Dexter Corporation as Hysol EA 9396 material. A mixture of 100 parts of Part A with 30 parts of Part B was made. The vacuum tool described with and shown in FIG. 7 was provided. Applied to the peripheral edge of the tool as the releasable gas seal was a vacuum bag sealant tape marketed by Schnee Morehead as ID #5144 tape. The dam 46 in FIG. 7 was made from an aluminum foil tape marketed by 3M Corp. as tape #425 and attached by pressing to the article surface about the discrete damaged portion. In another example, the above identified vacuum bag sealant tape was used to form the dam. The tool was releasably sealed by pressing the peripheral edge with the inboard surface about the damaged portion, as shown in the drawings, and a vacuum was provided within the tool within the above described range.

The repair material of above identified mixed resin system first was placed in a vacuum vessel within such vacuum range at ambient temperature and held for about 15 minutes to remove air entrapped within that fluid during mixing. With the fan blade supported so that the inboard surface was substantially horizontal to minimize flow of repair material at the damaged portion, the degassed repair resin system was placed in a syringe. Then, as shown in and described with FIG. 7, the resin was injected through self sealing membrane 44 to deposit the resin within dam 46 and over the delamination. Membrane 44 in this example was the above described vacuum bag sealant tape. With the degassed repair resin thus deposited at the damaged portion, the vacuum was released and the tool and releasable gas seal were removed from the article surface.

In this example, the deposited repair resin system was cured by heating the resin with a heat lamp at about 150° F. for about 90 minutes. Then the material of the dam was removed from about the now-repaired damaged portion. The resulting repair did not include porosity because entrapped air had been removed prior to curing.

The present invention has been described in connection with various specific examples, embodiments and combinations. However, it will be understood by those skilled in the appropriate arts that this invention is capable of a variety of modifications, variations and amplifications without departing from its scope as defined in the appended claims.

What is claimed is:

1. A vacuum tool including a releasable gas seal for use in the repair of a discrete damaged portion of an article surface; the tool comprising an outer wall including an opening there through; a peripheral edge about the opening shaped to conform generally with a portion of the article surface about the damage portion; and gas evacuation means to evacuate gas from within the tool; the releasable gas seal generally shaped to interface between the peripheral edge and the article surface and release from the article surface wherein:

the article surface is a root portion of an article, the article surface comprising an inboard surface including the discrete damaged portion and a pair of adjacent root surfaces spaced apart one from the other adjacent the inboard surface;

each of the pair of adjacent root surface connected with the inboard surface at an angle with the inboard surface, the inboard surface and the adjacent root surfaces together defining shaped continuous article surface including inflection portions within the article surface; and the peripheral edge of the tool about the opening is angled and shaped to conform and register with the shaped article surface and with the pair of adjacent root surfaces outside of the inboard surface.

2. The vacuum tool of claim 1 in which the releasable gas seal is secured with the peripheral edge.

3. The vacuum tool claim 1 in which the outer wall includes, in addition:

a port there through located to enable positioning of the port generally opposite the discrete damaged portion; and, a gas sealing member over the port.

4. The vacuum tool claim 3 in which the gas sealing member is a self-sealing elastic membrane.

5. The vacuum tool claim 3 in which the gas sealing member is a conduit with a valve.

6. The vacuum tool claim 1 in which the outer wall includes there through a vacuum measuring gauge.

7. The vacuum tool of claim 1 in which:

the article is a turbine engine blade;

the root portion of the article is a blade root including the shaped continuous article surface; and, the tool outer wall defines a rectangularly shaped box with the opening therethrough.

* * * * *